US009794528B2

(12) United States Patent
Mui

(10) Patent No.: US 9,794,528 B2
(45) Date of Patent: Oct. 17, 2017

(54) COLOR MEASUREMENT AND CALIBRATION

(71) Applicant: Color Match, LLC, Fairfax, VA (US)

(72) Inventor: Peter H. Mui, Fairfax, VA (US)

(73) Assignee: COLOR MATCH, LLC, Warrenton, VA (US)

(*) Notice: Subject to any disclaimer, the term of this patent is extended or adjusted under 35 U.S.C. 154(b) by 307 days.

(21) Appl. No.: 14/484,241

(22) Filed: Sep. 11, 2014

(65) Prior Publication Data
US 2015/0070510 A1  Mar. 12, 2015

Related U.S. Application Data

(60) Provisional application No. 61/876,737, filed on Sep. 11, 2013.

(51) Int. Cl.
G06K 9/00 (2006.01)
H04N 9/04 (2006.01)
H04N 17/00 (2006.01)
G01J 3/46 (2006.01)
G01J 3/52 (2006.01)

(52) U.S. Cl.
CPC ............... *H04N 9/04* (2013.01); *G01J 3/462* (2013.01); *G01J 3/463* (2013.01); *G01J 3/52* (2013.01); *G01J 3/522* (2013.01); *H04N 17/002* (2013.01)

(58) Field of Classification Search
USPC ........ 382/165, 164, 162, 167, 128; 345/109; 348/187, E13.037; 349/62, 96; 353/20; 359/485.03
See application file for complete search history.

(56) References Cited

U.S. PATENT DOCUMENTS

| | | | |
|---|---|---|---|
| 6,301,044 B1* | 10/2001 | Huber | G02B 27/26 348/E13.037 |
| 6,628,829 B1 | 9/2003 | Chasen | |
| 6,923,543 B2* | 8/2005 | Huber | G02B 27/26 349/96 |
| 6,924,817 B2 | 8/2005 | Rice et al. | |
| 6,959,111 B2 | 10/2005 | Hirayama et al. | |
| 8,009,884 B2* | 8/2011 | Chio | A61B 5/441 382/128 |
| 8,229,210 B2 | 7/2012 | Rao | |
| 2002/0021439 A1 | 2/2002 | Priestley et al. | |
| 2004/0078299 A1 | 4/2004 | Down-Logan et al. | |
| 2008/0008370 A1* | 1/2008 | Chio | A61B 5/441 382/128 |
| 2012/0045121 A1 | 2/2012 | Youngman et al. | |
| 2012/0099788 A1 | 4/2012 | Bhatti et al. | |
| 2012/0236144 A1 | 9/2012 | Rao | |
| 2013/0022264 A1 | 1/2013 | Atsmon | |

* cited by examiner

*Primary Examiner* — Anh Do
(74) *Attorney, Agent, or Firm* — Symbus Law Group, LLC; Clifford D. Hyra

(57) ABSTRACT

Embodiments described herein disclose a color measurement device and method for use with cameras or other imaging devices. The color measurement device may be configured to determine many different colors via a commonly owned device. Embodiments utilize sinusoidal grayscale rings to determine an exact color match of an unknown color, even if there is perspective distortion of an obtained image.

19 Claims, 5 Drawing Sheets

COLOR MEASUREMENT AND CALIBRATION

This application claims the benefit of U.S. Provisional Application No. 61/876,737, filed Sep. 11, 2013, which is hereby incorporated by reference in its entirety.

TECHNICAL FIELD

This disclosure relates generally to systems and methods for color measurement and calibration. Specifically, this disclosure relates to systems and methods for matching colors based on measurements utilizing a template card.

BACKGROUND

Color matching systems identify colors, such that the colors may be reproduced. Conventionally, a color matching system may include a standardized set of colors. Various manufactures in different locations may use the standard set of colors to match and to reproduce a color. However, an individual may not be able to determine a color within a standardized set that corresponds to an existing object, or a retail store may no longer carry an item in the color of the existing object. A very large standardized set of colors may be required to adequately match any given color, and even with a large standardized set of colors, the match may be inexact, particularly if the paint has aged.

At times, individuals need to generate a color that matches an existing color. For example, homeowners may need to generate paint that matches an existing paint color of a wall. Yet, it is economically impractical for an individual to purchase a colorimeter only for implementing a color scan to determine the paint color of the wall.

Furthermore, cameras alone cannot be used to determine true color values. This is because gain varies from camera to camera, and lighting associated with capturing a given image is subject to infinite variation. In conventional systems, an individual may utilize balance cards to calibrate the gain, the contrast, and the brightness of an imaging system. However, when utilizing balance cards to calibrate an imaging system for determining an image color, at least three such cards must be imaged in about the same setting and at about the same angle. This is a difficult task requiring precise diligence. In addition, even using three cards, accuracy is limited due to the fact that camera gain/response curves are not perfectly linear, generally resulting in unsatisfactory color matching.

Accordingly, needs exist for improved and efficient methods and systems for determining color measurements of an existing color.

SUMMARY

Embodiments disclosed herein provide systems and methods for color measurement and recognition of an unknown color. In embodiments, a template card with different samples may be utilized to determine an existing color. The template card may be utilized to determine a red, a green, and a blue color value of an unknown color. Using the determined red, green, and blue color values, the unknown color may be reproduced.

For true grays, red, blue, and green color intensities (or color values) are equal. Thus, when the intensity of a gray scale is discussed, it can be understood as a single value, which indicates that the red, blue, and green values of that gray scale are all that same value. For example, one (dark) gray has red, green, and blue intensities that are each 50, and is referred to as having an intensity of 50, while another (lighter) gray having an intensity of 200 would have red, green and blue color values of 200 (examples provided are for 8-bit color having 256 possible values for each color). Thus, finding the intensity of a gray color is equivalent to finding the red color value, blue color value, or green color value of the gray color.

In embodiments, the template card may include one or more full gray scale continuums, where the intensity along each continuum may be calculated based on geometric position. For example, a gray scale continuum may be a straight line across the template, with intensity as a function of linear position along the line. Similarly, a gray scale continuum may be a ring or other shape with intensity as a function of polar angle from the center of the continuum. A full continuum increases accuracy by eliminating the need for linear interpolation. Knowing the true intensity at every point along the gray scale continuum allows the effect of imaging system distortion to be eliminated. Since such distortion affects the gray scales and the unknown color sample equally, the true color value of an unknown sample may be determined by matching a color value of the unknown color sample to the determined intensity at a point on the gray scale continuum, and then determining the true intensity at that point on the gray scale continuum. In this way the true color value of the unknown sample may be determined irrespective of the distortion present.

Furthermore, the use of a black and white scale may lower production costs. Geometric markers may be used on the template card to correct for perspective distortion. It is critical to determine the geometric location of the matching point on the gray scale continuum so that the true intensity value can be determined using a known intensity function. Determining the geometric location may be difficult when an image is taken from an angle. Distinctive features at specified points on the template card can be used to correct for the perspective distortion. For example, corner quadratic wheels may be implemented to pinpoint the center of the template card as described below, regardless of the perspective distortion. In other embodiments, the corner quadratic wheels may be located at the midpoints of the side edges of a rectangular template.

In embodiments, a template card may include a center cut-out and three concentric rings, each of the concentric rings having 256 or more gray scales (each being a different shade or intensity of gray), wherein the gray scales may be modulated sinusoidally as a function of their angle in the polar coordinate. While other shapes may be used, concentric rings may allow multiple gray scale continuums to be placed in close proximity to a central unknown color sample, which may allow for simpler color value calculations. A central cut-out may allow for smaller color samples to be used and for simple geometric calculations. However, in some embodiments the cut-out may not be centrally located, or there may be no cut-out and the unknown color sample may be arranged adjacent to the template.

In embodiments, utilizing three concentric rings around a circular central cut-out may allow for polar angles of radial cross-sections of the concentric rings to be more easily determined when the center of the circular cut-out and intensity slice profiles of the three rings are known.

In embodiments, the inner and outer rings may be phase shifted by +120° and −120° with respect to the middle ring. This results in a known mathematical relationship between the three rings. Other phase shifts may be utilized, but may result in more complex mathematical relationships between the rings.

In embodiments, to determine the red, green, and blue color values of an unknown sample color, the template card with the center cut-out may be positioned over the unknown sample color. An imaging device or equivalent, such as a camera, may obtain an image of the template card superimposed on the unknown sample color. The imaging device may determine a true red value of the unknown color based on the intensity of the radial cross-section (known as a function of its angular coordinates) of at least one of the plurality of rings having an intensity in the image matching the determined red color value of the unknown color sample image.

In embodiments, the imaging device may determine a true green value of the unknown color based on the intensity of the radial cross-section of any or a combination of the plurality of rings which has in the image a determined green intensity matching the determined green color value of the unknown color sample image. The imaging device may determine a true blue value of the unknown color based on the intensity of the radial cross-section of any or a combination of the plurality of rings which has in the image a determined blue intensity matching the determined blue color value of the unknown color sample image.

In embodiments, a polar angle of a concentric ring radial cross-section may be determined using the determined intensities of the plurality of concentric rings and trigonometry. The polar angle may be used to calculate a true intensity of the concentric ring at that radial cross-section. Combining the determined red color value, green color value, and blue color value, the true color of the unknown color sample may be determined.

A new system for determining a true color of an unknown color sample includes a template having a cut-out and a plurality of concentric rings around the cut-out, each of the concentric rings having offset gray scales modulated as a function of an angle of a polar coordinate. A trigonometric relationship exists between the gray scales of the plurality of concentric rings, for example each concentric ring may be phase shifted with respect to the other concentric rings. The template may be a card formed with paper (such as cardboard), plastic, and/or various other materials. The template in embodiments may take many shapes, although a thin template may be desirable to avoid shadow from the template falling on an unknown color sample behind or adjacent to the template. In embodiments, the template may be an electronic display. For example, the template may be a display on a mobile electronic device screen.

In embodiments the system may include a RGB color module and an angular module. The RGB color module may be configured to determine, in an image of the template over the unknown color sample, a first radial cross-section of one of the concentric rings having an intensity that matches a determined average red color value of the image of the unknown color sample and to determine a true average red color value of the unknown color sample based on an intensity profile of the one of the concentric rings and a polar angle of the first radial cross-section. Any of the concentric rings may be used for matching a color value of the unknown color sample image. The angular module may be configured to determine the polar angle of the first radial cross-section. In embodiments, the polar angle of the first radial cross-section may be determined indirectly, by determining the polar angle of another radial cross-section of another of the concentric rings lying along the same radial segment as the first radial cross-section, for example if the polar angle is more easily calculated for that other concentric ring. For example, for a template with three concentric rings, the middle concentric ring may be used for polar angle determinations where the inner and outer concentric rings are phase shifted with respect to the middle concentric ring.

In embodiments the angular module may be configured to determine the polar angle of the first radial cross-section by comparing the intensity in the image of the first radial cross-section with an intensity in the image of a radial cross-section of another of the concentric rings along the same radial segment and utilizing the trigonometric relationship between the gray scales of the concentric rings. The comparison may be made with just one other concentric ring and corresponding radial cross-section or with two or more others. The radial segment may be constructed by determining a centroid of the cut-out and drawing a line from the centroid through the radial cross-section.

In embodiments the RGB color module may be further configured to determine, in the image of the template over the unknown color sample, a second radial cross-section of a second one of the concentric rings having an intensity that matches a determined average green color value of the image of the unknown color sample and to determine a true average green color value of the unknown color sample based on a ring intensity profile of the second one of the concentric rings and a polar angle of the second radial cross-section, and to determine, in the image of the template over the unknown color sample, a third radial cross-section of a third one of the concentric rings having an intensity that matches a determined average blue color value of the image of the unknown color sample and to determine a true average blue color value of the unknown color sample based on a ring intensity profile of the third one of the concentric rings and a polar angle of the third radial cross-section. The angular module may be configured to determine the polar angle of the second and third radial cross-sections.

In embodiments the system may also include an exact color module configured to determine the true color of the unknown color sample based on the true average red color value of the unknown color sample, the true average green color value of the unknown color sample, and the true average blue color value of the unknown color sample.

In embodiments each concentric ring may be phase shifted a given angle from each other concentric ring. For example, in an embodiment with three concentric rings, the second concentric ring may be phase shifted a first given angle from the first concentric ring and the third concentric ring may be phase shifted a second given angle from the second concentric ring. Each of these given angles may be for example 120°.

In embodiments the system may also include an image capturing device configured to obtain an image of the template over the unknown color sample.

In embodiments the template may include distinctive markings at known locations such that the center of the concentric rings can be determined from an image of the template using geometric relationships between the distinctive markings and the center of the concentric rings. For example, the template may be rectangular, the distinctive markings may be corner markings, and the center of the concentric rings may be at the center of the template, such that the center of the concentric rings in the image can be determined based on an intersection of a first line from a first of the corner markings diagonally to a third of the corner markings and a second line from a second of the corner markings diagonally to a fourth of the corner markings.

Similarly, the template could be circular and the markings at 90 degree angles around the circumference. The center of the concentric rings may be used to determine the radial segment on which a radial cross-section lies (as the radial segment extends from the center and through the radial cross-section).

In embodiments the RGB module may also be configured to determine, in the image of the template over the unknown color sample, another radial cross-section of another of the concentric rings having an intensity that matches the determined average red color value of the image of the unknown color sample and to determine a second true average red color value of the unknown color sample based on a ring intensity profile of the another of the concentric rings and a polar angle of the another radial cross-section, and to determine a final true average red color value of the unknown color sample by calculating a weighted average of the true average red color value and the second true average red color value. For example, the first radial cross-section could be of the middle ring and the another radial cross-section of the inner or outer ring. Any ring may be used to determine the true average red (or other) color value of the unknown color sample, and by making the determination multiple times and averaging the results, certain sources of error may be reduced.

A new method for determining a true color of an unknown color sample includes obtaining an image, where the image includes the unknown color sample and a template having a cut-out and a plurality of concentric rings around the cut-out, each of the plurality of concentric rings having offset gray scales modulated as a function of an angle of a polar coordinate, where a trigonometric relationship exists between the gray scales of the plurality of concentric rings, determining a first radial cross-section of one of the concentric rings that matches a determined average red color value of the unknown color sample in the image, determining a polar angle of the first radial cross-section, and determining a true average red color value of the unknown color sample based on an intensity profile of the one of the concentric rings and the polar angle of the first radial cross-section.

Although it may be desirable for the image to include the concentric rings and any markings for determining the center of the concentric rings, the image need not necessarily contain the entire template. In embodiments, the image may be uploaded by a user over a computer network (e.g. the Internet) via a website, software application, or similar. An image acquisition module may be used to receive the image from the user and/or to analyze the image, for example to notify the user if the image lacks the template entirely or lacks any feature of the template (e.g. concentric rings or other grayscale continuums, markings for center-finding, etc.). This may be done for example by comparing the obtained image with images of one or more templates stored in a database or other computer storage medium, using known image analysis methods.

In embodiments the method may also include positioning the cut-out of the template over the unknown color sample, and obtaining the image may include actuating an image-capturing device. For example, a camera may be used to take a picture of the template after placing it over the unknown color sample. The camera may be on a mobile electronic device. An app on a mobile electronic device or a website accessed via a browser on a mobile electronic device may prompt a user to take the picture, and may automatically process the image according to the methods steps described, or transmit it e.g. over a computer network to another location for processing.

In embodiments the polar angle of the first radial cross-section may be determined by comparing the intensity in the image of the first radial cross-section with an intensity in the image of a radial cross-section of another of the concentric rings along the same radial segment as the first radial cross-section and utilizing the trigonometric relationship between the gray scales of the concentric rings. Although the intensities in the image may not be the true intensities of the imaged colors, the sources of errors inherent in the image-taking process may apply relatively equally to different parts of the image (e.g. the unknown color sample and the gray scale continuums), leaving the relationship between the color values of the concentric rings/gray scale continuums intact.

In embodiments the method may include determining, in the image, a second radial cross-section of a second one of the concentric rings having an intensity that matches a determined average green color value of the image of the unknown color sample and determining a true average green color value of the unknown color sample based on a ring intensity profile of the second one of the concentric rings and a polar angle of the second radial cross-section, and determining, in the image, a third radial cross-section of a third one of the concentric rings having an intensity that matches a determined average blue color value of the image of the unknown color sample and determining a true average blue color value of the unknown color sample based on a ring intensity profile of the third one of the concentric rings and a polar angle of the third radial cross-section, and determining the polar angle of the second and third radial cross-sections.

In embodiments the true color of the unknown color sample may be determined based on the true average red color value of the unknown color sample, the true average green color value of the unknown color sample, and the true average blue color value of the unknown color sample.

In embodiments the template may also have distinctive markings at known locations and the center of the concentric rings may be determined from the image using geometric relationships between the distinctive markings and the center, and the center of the concentric rings may be used to determine the radial segment on which a radial cross-section lies.

In embodiments the method may include determining, in the image, another radial cross-section of another of the concentric rings having an intensity that matches the determined average red color value of the image of the unknown color sample and determining a second true average red color value of the unknown color sample based on a ring intensity profile of the another of the concentric rings and a polar angle of the another radial cross-section, and determining a final true average red color value of the unknown color sample by calculating a weighted average of the true average red color value and the second true average red color value. This step may be repeated with any number of additional gray scale continuums (e.g. concentric rings of gray scales). Such processes may reduce the effect of image-capturing errors that apply unequally to different imaged areas.

A new color identification system may include a template comprising one or more full gray scale continuums, where the true intensity along each continuum is a function of geometric position on the template, an image obtaining device configured to obtain an image of an unknown color sample adjacent to the template, and color identification modules configured to determine geometric positions on the gray scale continuums in the image where their intensity matches determined red, green, and blue color values of the image of the unknown color sample, and to use the determined geometric positions to determine the true intensity of the gray scale continuum at each geometric position, and to use these true intensities to determine the color of the unknown color sample.

A new color identification method includes obtaining an image of an unknown color sample adjacent to a template comprising one or more full gray scale continuums, where the true intensity along each continuum is a function of geometric position on the template, determining geometric positions on the gray scale continuums in the image where intensity matches determined red, green, and blue color values of the image of the unknown color sample, determining true intensities of the gray scale continuums at the geometric positions based on the determined geometric positions and the relationship between geometric position and true intensity, and determining the color of the unknown color sample based on these true intensities.

For example, in an embodiment a linear gray scale continuum (where the intensity of the gray scale is a function of linear distance along this continuum) on a template is imaged next to an unknown color sample. A first geometric position on the image of the linear gray scale continuum having an intensity matching the average red color value of the image of the unknown color sample, a second geometric position on the image of the linear gray scale continuum having an intensity matching the average green color value of the image of the unknown color sample, and a third geometric position on the image of the linear gray scale continuum having an intensity matching the average blue color value of the image of the unknown color sample are determined using known image analysis techniques. The first, second and third geometric positions on the image are translated into first, second, and third linear distances along the gray scale continuum using e.g. known image analysis techniques, distinctive markings, etc. Then the first, second and third linear distances and the function of the true intensity of the gray scale continuum with respect to linear distance along the continuum are used to determine the true intensity of the gray scale continuum at each geometric position, corresponding to the true red color value, true green color value, and true blue color value, respectively, of the unknown color sample. Together, these true color values are used to determine the true color of the unknown color sample.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
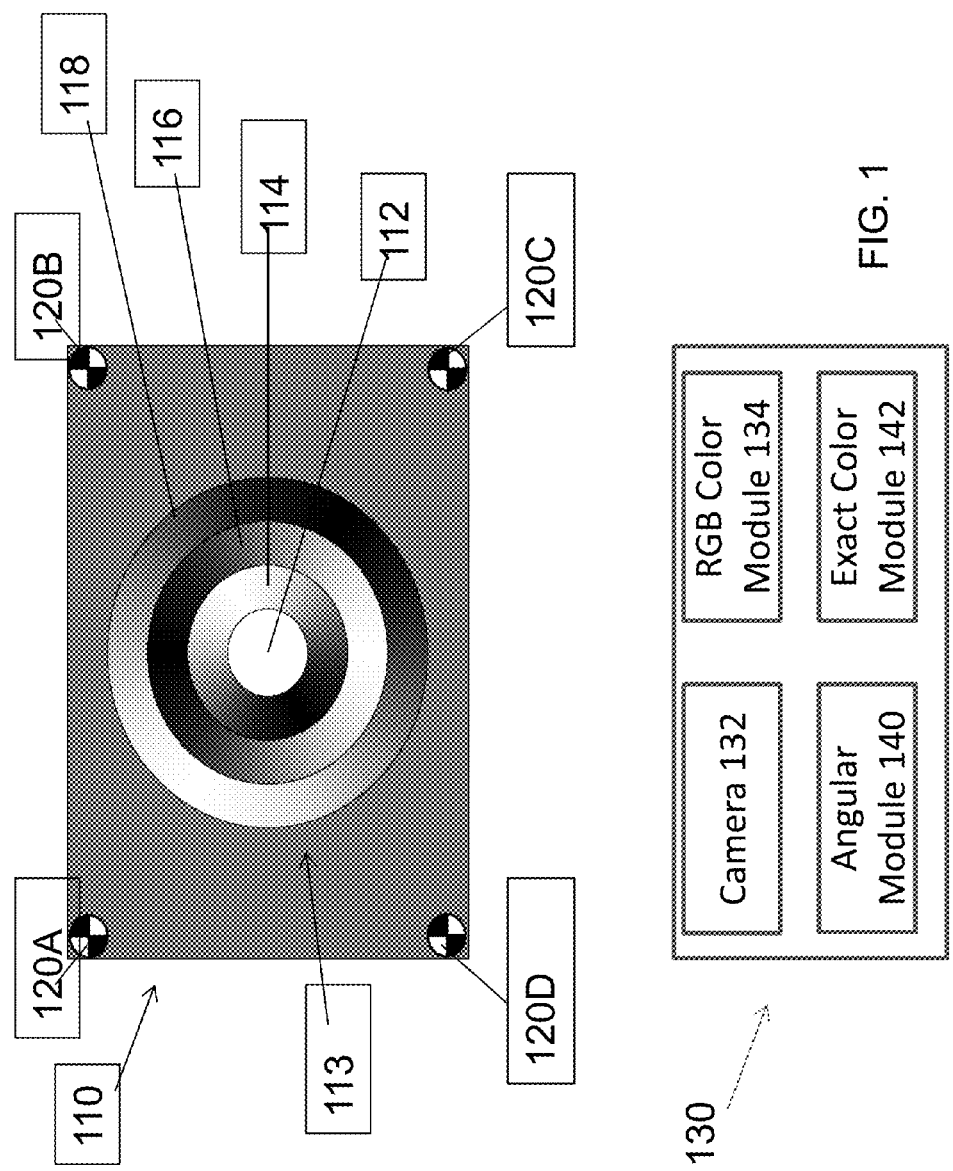
FIG. 1 depicts an embodiment of a template card and a color measurement device.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Furthermore, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer, desktop, laptop, netbook, tablet, smartphone, or the like, communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database locally or over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

Embodiments described herein disclose a color measurement device and method for use with cameras or any imaging device. The color measurement device may be configured to determine many different colors via a commonly owned device. Embodiments utilize sinusoidal grayscale rings to determine an exact color match of an unknown color, even if there is perspective distortion in the obtained image.

FIG. 1 depicts an embodiment template card 110 and a color measurement device 130 for determining an exact color match of an unknown color.

Template card 110 may include a center cut-out 112, a plurality of concentric rings 113, and corner quadratic wheels 120A-D. In embodiments, a single template card 110 may include a plurality of different continuous gray scale samples 114, 116, 118. To determine an unknown color, it may be unnecessary or inefficient to include samples of different colors, other than gray scales, on template card 110 because a gray scale sample includes red, green, and blue responsive curves.

Center cut-out 112 may be an orifice disposed at the center of template card 110. Center cut-out 112 may be configured to be disposed over an unknown color sample, such that template card 110 may be superimposed on the unknown color and color measurement device 130 may be configured to obtain an image of the unknown color through center cut-out 112.

The plurality of concentric rings 113 may include an inner ring 114, a middle ring 116, and an outer ring 118. Each of the plurality of concentric rings 113 may have two hundred and fifty-six gray scales that are modulated sinusoidally as a function of their angle in the polar coordinate (256 gray scales corresponding to 8-bit color). One skilled in the art will appreciate that in other embodiments, a different number of gray scales per each of the plurality of concentric rings 113 may be used. For example, 65,535 gray scales could in theory be used for 16-bit color. In one embodiment, inner ring 114 may be phase shifted by +120° with respect to middle ring 116, and outer ring 118 may be phase shifted by −120° with respect to middle ring 116. Because the plurality of concentric rings 113 are phase shifted and have two hundred and fifty six gray scales, middle ring 116 may have an intensity profile of $Im=A*\cos(t)+B$, inner ring 114 may have an intensity profile of $Ii=A*\cos(t+120°)+B$, and outer ring 118 may have an intensity profile of $Io=A*\cos(t-120°)+B$. In embodiments, A and B may be chosen to maximize the template printer dynamic range of the gray scales, where A may be a white scaling and B may be a black offset, and t may be a polar angle of a radial cross section of the plurality of concentric rings 113.

Corner quadratic wheels 120A-D may each be disposed at a corner of template card 110, and may each be divided into four equal subsections. Because corner quadratic wheels 120A-D are distinct, known image processing techniques, such as cross, corner, or symmetry detectors may be used to identify the centers of each corner quadratic wheel 120A-D. The intersection point of a first diagonal line from the center of corner quadratic wheel 120A to corner quadratic wheel 120C and a second diagonal line from the center of corner quadratic wheel 120B to corner quadratic wheel 120D may be configured to determine the centroid of center cut-out 112. Since lines remain lines, even at different viewing perspectives, this technique is robust against any camera tilt. Any segment emanating from the center of center cut-out 112 may, in this embodiment, be a true radius of the plurality of concentric rings 113.

Color measurement device 130 may be a device configured to obtain an image of an unknown color sample, determine polar angles (t) of radial cross-sections of the concentric rings 113 where the determined intensity matches the determined red, green, and blue values for the color sample image, and determine a color match of the unknown color based on a true red color value, a true green color value, and a true blue color value of the color sample responsive to functions of the polar angles (t). In embodiments, an unknown camera gain and lighting effects may not affect the determined true red, green, and blue color values because the camera gain and lighting effects affect template card 110 in the same manner as they affect a sample of the unknown color.

Inevitably, there may be some difference in camera gain and/or lighting gain between different regions of the template card 110 (e.g. the color sample and the surrounding rings) but the difference may be negligible. To achieve a given RGB measurement error, the residual nonuniformity of camera gain and lighting effects between the unknown color sample and the rings may be less than three times the desired RGB measurement error. In other words, to achieve RGB values with 98% accuracy, nonuniformity may be up to 6%. Nonuniformity of less than three times desired RGB measurement error may be considered equality of camera gain and lighting effects between the unknown color sample and the concentric rings 113.

In embodiments where the background color of the card (e.g. outside the concentric rings, excluding any distinctive markings such as corner quadratic wheels) is uniform and known, one can utilize this fact to compute and subtract out of any smooth nonuniformity, resulting in a residual non-uniformity several times smaller than the actual. This may be done by sampling a number of points in the image of the template background, which are known to be the same color, and determining the variance in the image from the known color based on the location of the point to find and remove smooth nonuniformity. For example, the points may be fitted to a parabolic curve, with everything up to the $2^{nd}$ order removed. Some allowance may be made for potential discoloration of the background due to long or heavy use, soiling, etc., which may for example result in data points that are discarded as too far off the known background color, or in a notification regarding this possible problem, which may prompt the user to decide whether to drop the data point, or to abandon the smooth nonuniformity removal process.

Using the embodiments depicted in the FIGURES, equality of camera gain and lighting effects may be achieved in all but the most extreme lighting conditions (e.g. a sharp and dark shadow directly across one side of the rings).

In embodiments, color measurement device 130 may include a camera 132, an RGB color module 134, an angular module 140, and an exact color module 142.

The measurement device 130 may be configured to execute modules 134, 140, and 142 by software; hardware; firmware; some combination of software, hardware, and/or firmware; and/or other mechanisms for configuring processing capabilities on measurement device 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 134, 140, and 142 are illustrated in FIG. 1 as being implemented within a single measurement device, in implementations one or more of modules 134, 140, 142 may be implemented remotely from the other modules. The description of the functionality provided by the different modules 134, 140, and 142 described below is for illustrative purposes, and is not intended to be limiting, as any of modules 134, 140, and 142 may provide more or less functionality than is described. For example, one or more of modules 134, 140, and 142 may be eliminated, and some or all of its functionality may be provided by other ones of modules 134, 140, and 142. As another example, measurement device 130 may be configured to execute one or more additional modules that may perform some or all of the functionality attributed below to one of modules 134, 140, and 142.

Camera 132 may be a device configured to record images, which may be still images or videos. In embodiments, camera 132 may be configured to record an image or a frame of a video of an unknown color through center cut-out 112 of template card 110. In embodiments, camera 132 may be included in a mobile phone, DSLR camera, point and shoot camera, webcam, any consumer image device, or any other device configured to obtain an image.

RGB color module 134 may be configured to determine a red color value of the unknown color based on an average red color reading of the unknown color and determined intensity and intensity profile of inner ring 114 (and/or middle ring 116 and outer ring 118). In embodiments, the radial cross section of inner ring 114 may be chosen to determine the red color value of the unknown sample because inner ring 114 may be the most proximate of the plurality of concentric rings 113 to the sample of the unknown color. Therefore, inner ring 114 may be the least sensitive of the plurality of concentric rings 113 to any non-uniformity of color measurement device 130.

First, the radial cross-section of the inner ring 114 where the measured intensity of the inner ring 114 matches the measured average red color reading of the unknown color is determined. Second, the true polar angle (t_red) of this radial cross-section is determined using angular module 140 (as discussed in detail below). Third, the true average red color value of the unknown color is determined as the inner ring intensity at the calculated polar angle (t) using the inner ring intensity profile Ii=A*cos(t_red+120)+B and the known polar angle (t_red) and A and B values. This procedure is then repeated for the green color determination and the blue color determination, with the true polar angles for green and blue, t_green and t_blue, used instead of t_red.

Each gray-scaling ring 112, 114, 116 includes all three color modulations, red, green, and blue, making embodiments compact, universal, and inexpensive to print. Although the proximity advantage of the inner ring 114 may be lost, other implementations may utilize the middle ring 116 or the outer ring 118 or even a combination of all three for determining the red, green and/or blue color values of the unknown color sample. A combination of rings 112, 114, 116 might be used, for example, by finding the true average color values using two or all three of the rings 112, 114, 116 independently, and then averaging the determined values or using a weighted average, which may account for lessened accuracy as the determinations move away from the center of the template card 110. For example, the inner ring value may be given a 50% (½) weight, the middle ring value may be given a 33% (⅓) weight, and the outer ring value may be given a 17% (⅙) weight. Using a combination may help to compensate for uneven shadow and/or eliminate noise.

Angular module 140 may be configured to determine the polar angle (t) of the radial cross-section of each of the plurality of concentric rings 113 where the intensity matches the measured average color value of the unknown color. In embodiments, if camera 132 obtains an image of template card 110 superimposed over the unknown color from a tilted or off-center perspective, the observed concentric ring 113 patterns of the obtained image may change. For example, if an image of template card 110 is obtained from a tilted perspective, the plurality of concentric rings 113 may appear to be elliptical instead of circular. However, the radial cross-sections of the plurality of the concentric rings 113 remain the same, since a line remains a line irrespective of the view angle. The polar angles (t) of the radial cross-sections may be determined from the sampled intensities of each concentric ring 113, as discussed below. So, once determined, the polar angles (t) of the plurality of concentric rings 113 may then be utilized to look up the true red, green, and blue color values.

Thus, first a radial section from the center of the template cut-out 112 through the radial concentric rings 113 is found which best matches the sample intensity to the intensity of the radial cross-section of one of the concentric rings 113 through which the radial segment extends. That is done simply by matching the intensity of the sample to the intensity of a cross section of one of the concentric rings 113 and extending a segment from that radial cross-section through the center of the template card 110 and through the circumference of the outer ring 118. Once that is accomplished, one can use the intensities of the concentric rings 113 cross-sections to determine the polar angle (t) using determined intensity values of the cross-sections and the known (and designed) trigonometric relationship between the intensity profiles of the concentric rings 113. Once the best estimated polar angle is known, it can be used to infer the color intensity of the unknown sample. Angular module 140 may be configured to determine the polar angle (t) utilizing the intensity profiles of each of the plurality of concentric rings 113 (completely independent of the camera gain and lighting conditions) and trigonometric manipulations of the intensity profiles of the plurality of the concentric rings 113 as intersected by the radial segment.

In embodiments, the total camera and lighting scaling gain (k) affects template card 110 in the same manner as it affects the unknown color. The intensity profile of middle ring 116 may have a gain intensity profile equal to Pm=k*A*cos(t)+k*B, the intensity profile of inner ring 114 may have a gain intensity profile equal to Pi=k*A*cos(t+120)+k*B, and the intensity profile of outer ring 118 may have a gain intensity profile equal to Po=k*A*cos(t−120)+k*B. Utilizing trigonometry properties, angular module 140 may determine the polar angle (t) of a given radial cross-section using the equation t=a tan 2[(Po−Pi)*sqrt(3), 2*Pm−(Pi+Po)], where the intensities of the concentric rings at the given radial cross-section can be measured directly and substituted into the equation to solve for t. Note that the variables associated with gain and lighting conditions drop out of the equation. Even though the measured intensities may not match the actual intensities, as all the concentric rings 113 will be subject to the same error sources, the trigonometric relationship between the measured intensities of the concentric rings will hold, allowing the true polar angle to be determined.

Exact color module 142 may be configured to determine the true color of the unknown sample. Exact color module 142 may determine the true color of the unknown sample based on the average red, green, and blue (RGB) color values of the unknown sample as determined by RGB color module 134. Accordingly, color measurement device 130 may be configured to determine the angular coordinates of radial cross-sections of each of the plurality of concentric rings 113 on template card 110 even if an obtained image of template card 110 includes perspective distortion. Furthermore, color measurement device 130 may be configured to determine the color of an unknown color sample based on the behaviors of three different intensity profiles of the plurality of concentric rings.

Figure 2:
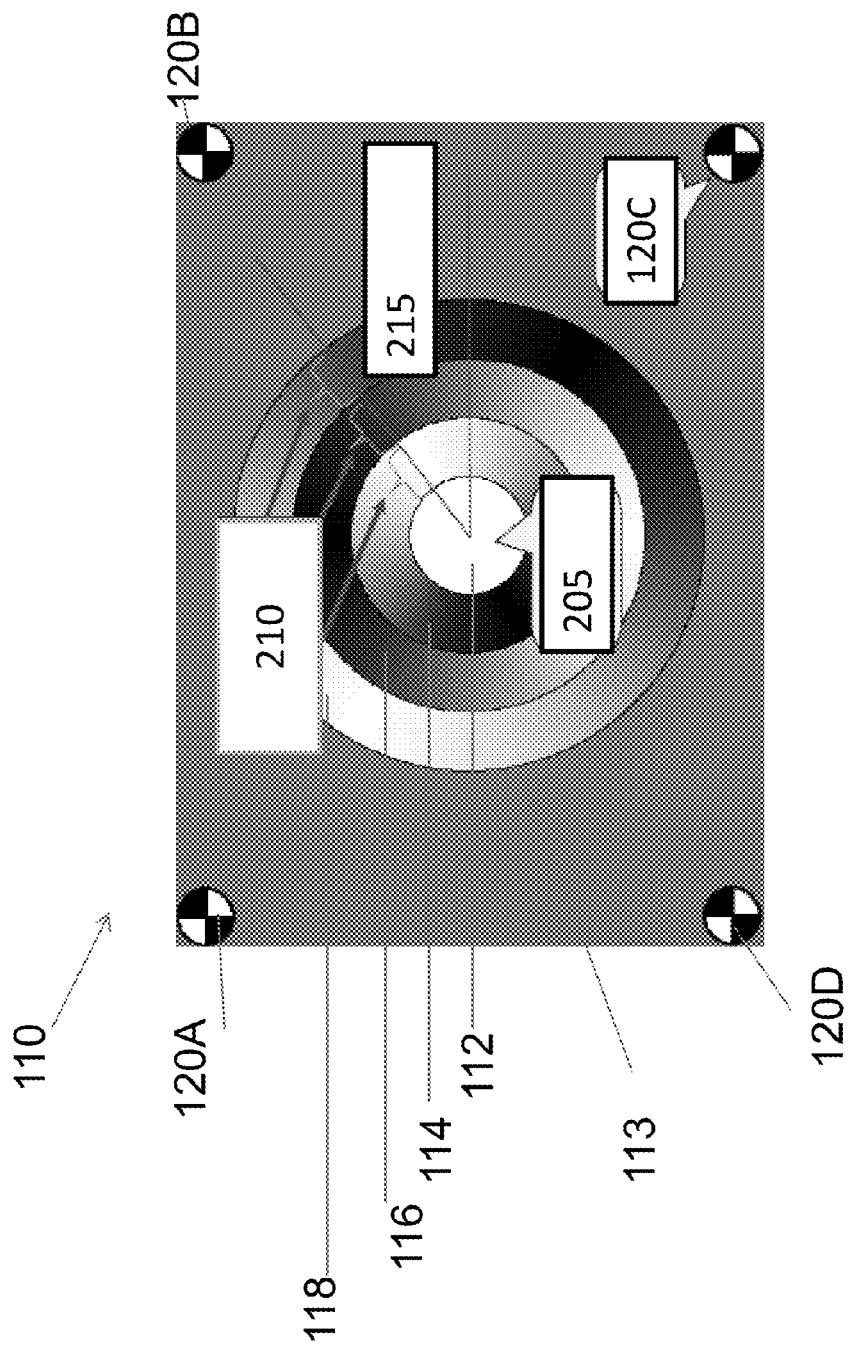
FIG. 2 depicts an embodiment of a template card.

FIG. 2 depicts an example embodiment of template card 110. Template card 110 may include a center cut-out 112, a plurality of concentric rings 113, and corner quadratic wheels 120A-D.

Center cut-out 112 may be configured to be disposed over an unknown color, such that the measured color values of the unknown color 205 may be compared with the radial segment cross-sections 210 of each of the plurality of concentric rings 113, including inner ring 114, middle ring 116, and an outer ring 118. Each of the plurality of concentric rings 113 may be associated with any or all of the different red, green, and blue color values of the unknown color. Therefore, based on the unknown color values, there will be different polar angles (t) 215, at which any or combination of radial segment cross-sections at the color values correspondingly best match the unknown color values.

Corner quadratic wheels 120A-D may be each disposed at a corner of template card 110, and may each be divided into four equal subsections. The intersection of a first diagonal line from the center of corner quadratic wheel 120A to corner quadratic wheel 120C and a second diagonal line from the center of corner quadratic wheel 120B to corner quadratic wheel 120D may determine the center of center cut-out 112.

Responsive to determining the center of center cut-out 112, the polar angles (t) 215 of radial segment cross-sections 210 of concentric rings 113 on template card 110 corresponding to the color values of the unknown color 205 may be determined with measured intensities. Based on the polar angles (t) 215 and the known intensity profiles of each of the plurality of concentric rings 113, the true color values of the unknown color may then be determined.

Figure 3:
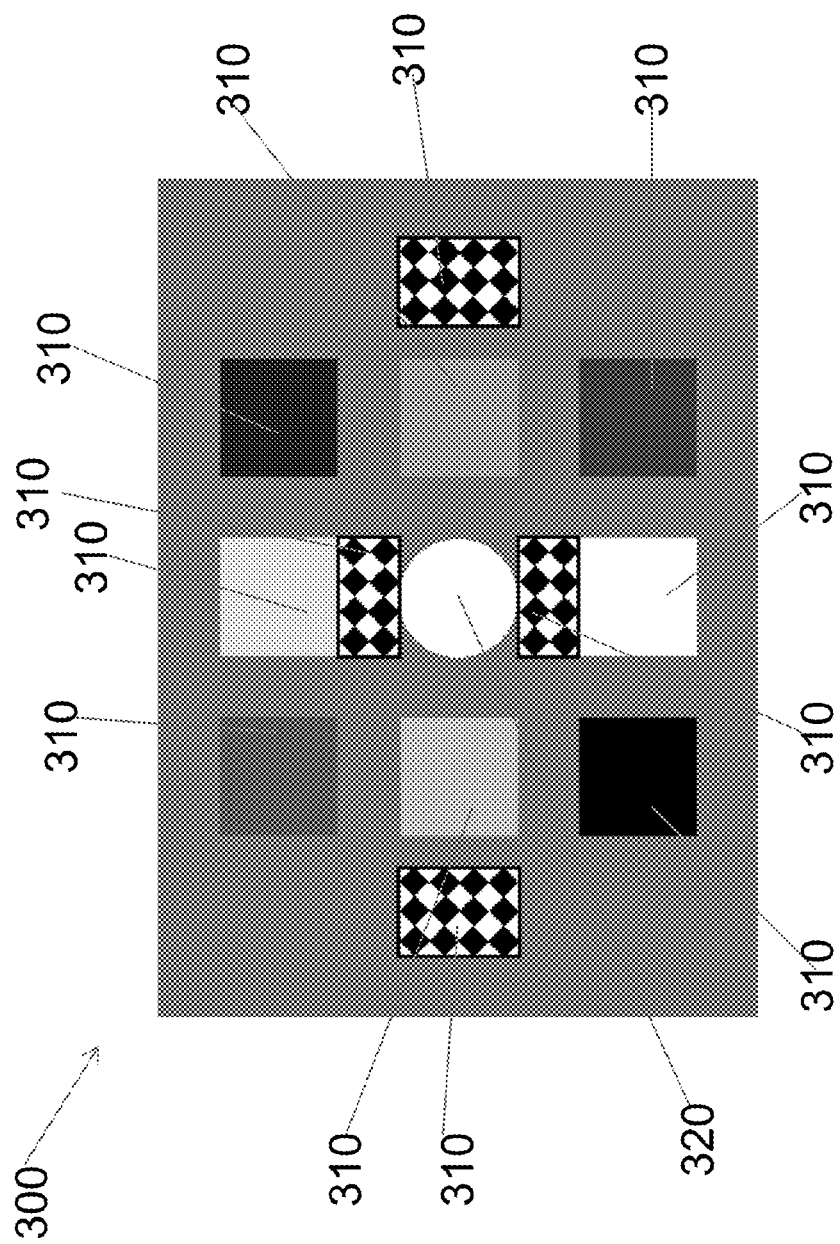
FIG. 3 depicts an embodiment of a template card.

FIG. 3 depicts another example embodiment of template card 300. Template card 300 may include a plurality of different gray scale samples 310 and center cut-out 320. Measured red, green, and blue color values of an image obtained of an unknown color through center cut-out 320 may be compared with samples 310 to find matches, with linear interpolation used to resolve color values between the intensities of the samples 310. By incorporating a plurality of samples, a color measurement device such as color measurement device 130 depicted in FIG. 1 can determine an approximate true color of the unknown color while mitigating nonlinearity of an obtained image.

Figure 4:
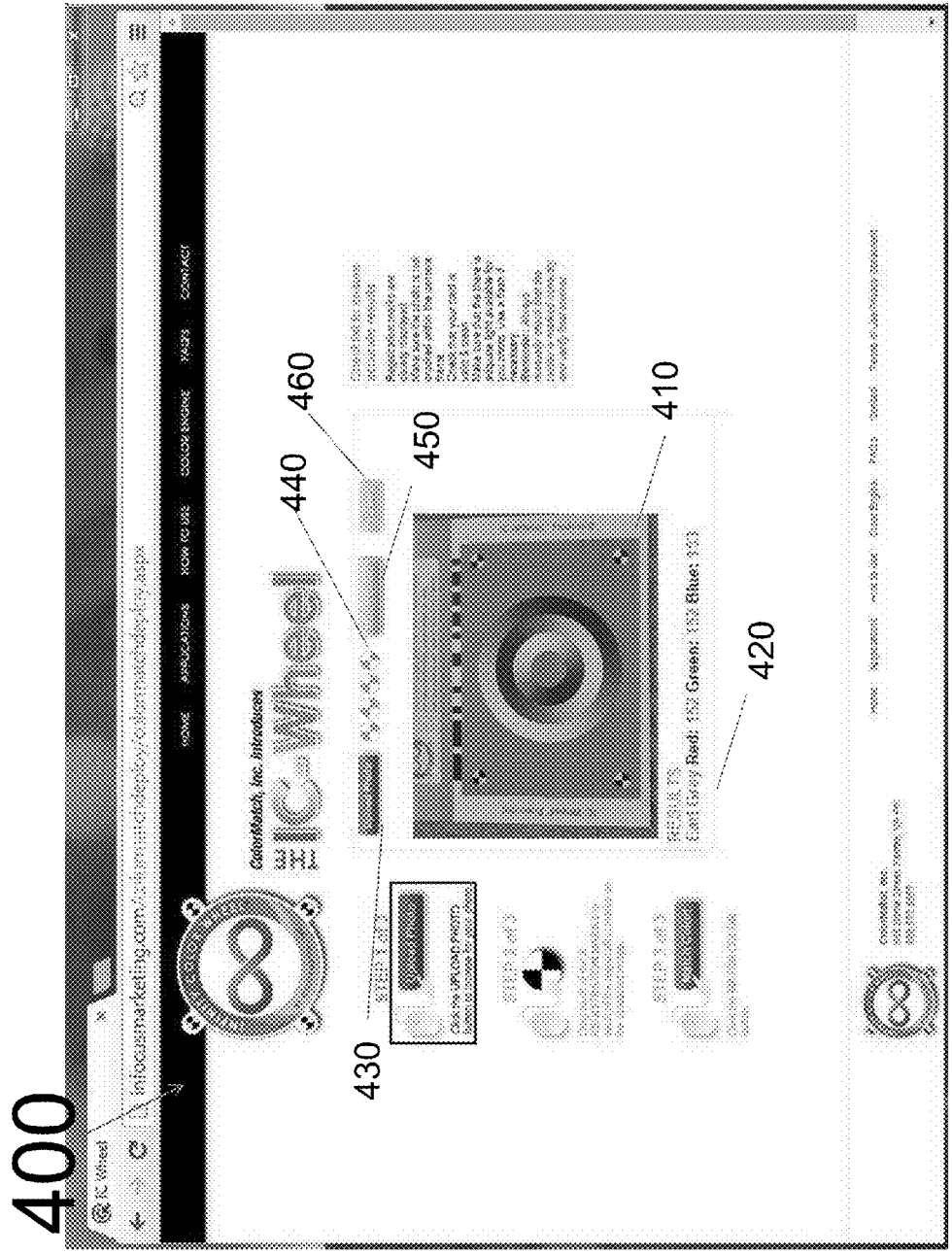
FIG. 4 depicts a screenshot of a color matching web application.

FIG. 4 depicts a screenshot 400 of a color matching web application. In embodiments, a photograph 410 including a template and unknown color sample may be uploaded, and the web application may be configured to determine a color 420 for the color sample utilizing embodiments as discussed above. The web application may be configured to utilize the configuration of the template card and the specifications of the camera used to take the photograph with the unknown sample color. In the embodiment shown, a user can select an Upload Photo button 430 to upload the photo 410 from the user's computer or device to a web server, where it is displayed to the user as shown. After the upload, corner quadratic wheels 440 become active, and the user drags each of the corner quadratic wheels 440 to the location of a corner quadratic wheel in the uploaded image 410. In other embodiments, identification of the corner quadratic wheels (or other distinctive markings) in the uploaded image may be performed wholly automatically, but this manual input may improve accuracy and/or simplify image processing. Selection of the Match Color button 450 triggers results 420 to be displayed, while Reset button 460 starts the process over.

Figure 5:
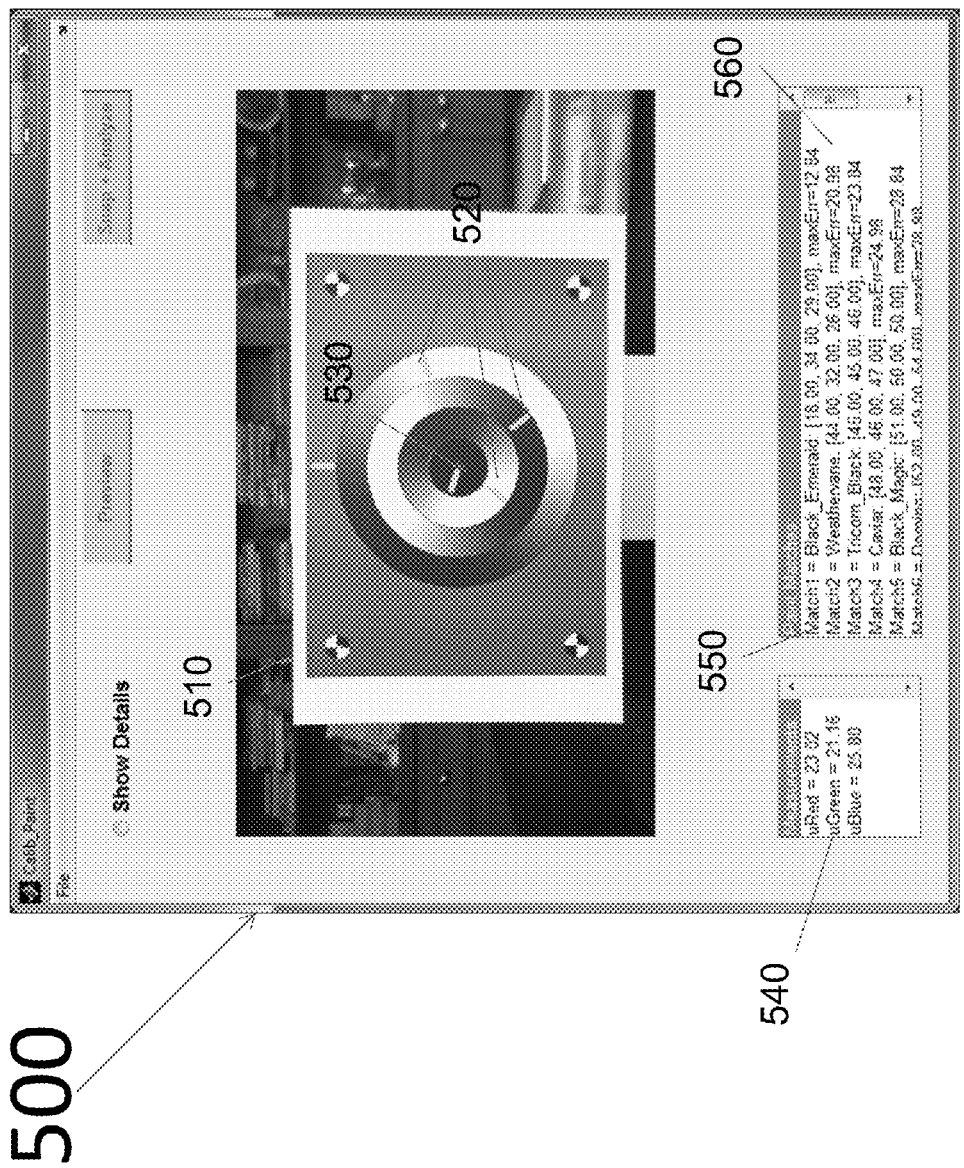
FIG. 5 depicts a screenshot of a color matching software.

FIG. 5 depicts a screenshot 500 of a color matching software. In screenshot 500, an uploaded photograph 510 is depicted. On the photograph, the radial cross-sections 520 of the three rings that match (one of) the RGB color values of the color sample are shown, as well as the center of the color sample 530. Below the photograph, the calculated RGB measurements 540 are depicted with potential color matches 550 and their maximum error from the measured RGB values 560. These color matches may be selected from a database of colors, for example available paint colors from a paint manufacturer.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that, in some instances, some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment, and a person of ordinary skill in the art will recognize that additional embodiments are readily understandable and are a part of this invention.

It is also within the spirit and scope of the invention to implement in software programming or coding the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, where programmable logic devices, field programmable gate arrays, and optical, chemical, biological, quantum, or nanoengineered systems, components, and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What I claim is:

1. A system for determining a true color of an unknown color sample, the system comprising:
    a template card including a cut-out and a plurality of concentric rings around the cut-out, each of the concentric rings having offset gray scales modulated as a function of an angle of a polar coordinate, wherein there is a trigonometric relationship between the gray scales of the plurality of concentric rings;
    a RGB color processor configured to determine, in an image of the template card over the unknown color sample, a first radial cross-section of one of the concentric rings having an intensity that matches a determined average red color value of the image of the unknown color sample and to determine a true average red color value of the unknown color sample based on an intensity profile of the one of the concentric rings and a polar angle of the first radial cross-section; and
    an angular processor configured to determine the polar angle of the first radial cross-section.

2. The system of claim 1, wherein the angular processor is configured to determine the polar angle of the first radial cross-section by comparing the intensity in the image of the first radial cross-section with an intensity in the image of a radial cross-section of another of the concentric rings along a same radial segment and utilizing the trigonometric relationship between the gray scales of the concentric rings.

3. The system of claim 1, wherein the RGB color processor is further configured to determine, in the image of the template card over the unknown color sample, a second radial cross-section of a second one of the concentric rings having an intensity that matches a determined average green color value of the image of the unknown color sample and to determine a true average green color value of the unknown color sample based on a ring intensity profile of the second one of the concentric rings and a polar angle of the second radial cross-section, and to determine, in the image of the template card over the unknown color sample, a third radial cross-section of a third one of the concentric rings having an intensity that matches a determined average blue color value of the image of the unknown color sample and to determine a true average blue color value of the unknown color sample based on a ring intensity profile of the third one of the concentric rings and a polar angle of the third radial cross-section, and wherein the angular processor is configured to determine the polar angle of the second and third radial cross-sections.

4. The system of claim 3, further comprising an exact color processor configured to determine the true color of the unknown color sample based on the true average red color value, the true average green color value, and the true average blue color value.

5. The system of claim 1, wherein each concentric ring is phase shifted a given angle from each other concentric ring.

6. The system of claim 5, wherein the plurality of concentric rings comprise three concentric rings, the second concentric ring being phase shifted a first given angle from the first concentric ring and the third concentric ring being phase shifted a second given angle from the second concentric ring.

7. The system of claim 1, further comprising an image capturing device configured to obtain an image of the template card over the unknown color sample.

8. The system of claim 1, wherein the template card further comprises distinctive markings at known locations and wherein the center of the concentric rings can be determined from an image of the template card using geometric relationships between the distinctive markings and the center.

9. The system of claim 8, wherein the template card is rectangular, the distinctive markings comprise corner markings, and the center of the concentric rings is at the center of the template card, wherein the center of the concentric rings in the image can be determined based on an intersection of a first line from a first of the corner markings diagonally to a third of the corner markings and a second line from a second of the corner markings diagonally to a fourth of the corner markings, wherein the center of the concentric rings is then used to determine a radial segment on which a radial cross-section lies.

10. The system of claim 1, wherein the RGB processor is further configured to determine, in the image of the template card over the unknown color sample, another radial cross-section of another of the concentric rings having an intensity that matches the determined average red color value of the image of the unknown color sample and to determine a second true average red color value of the unknown color sample based on an intensity profile of the another of the concentric rings and a different polar angle of the another radial cross-section, and to determine a final true average red color value of the unknown color sample by calculating a weighted average of the true average red color value and the second true average red color value.

11. A method for determining a true color of an unknown color sample, the method comprising:
obtaining an image wherein the image includes the unknown color sample and a template comprising a cut-out and a plurality of concentric rings around the cut-out, each of the plurality of concentric rings having offset gray scales modulated as a function of an angle of a polar coordinate and a trigonometric relationship existing between the gray scales of the plurality of concentric rings;
determining a first radial cross-section of one of the concentric rings that matches a determined average red color value of the unknown color sample in the image;
determining a polar angle of the first radial cross-section; and
determining a true average red color value of the unknown color sample based on an intensity profile of the one of the concentric rings and the polar angle of the first radial cross-section;
wherein the method is performed utilizing a camera.

12. The method of claim 11, further comprising positioning the cut-out of the template over the unknown color sample, wherein obtaining the image comprises actuating an image-capturing device.

13. The method of claim 11, wherein the polar angle of the first radial cross-section is determined by comparing the intensity in the image of the first radial cross-section with an intensity in the image of a radial cross-section of another of the concentric rings along a same radial segment as the first radial cross-section and utilizing the trigonometric relationship between the gray scales of the concentric rings.

14. The method of claim 11, further comprising determining, in the image, a second radial cross-section of a second one of the concentric rings having an intensity that matches a determined average green color value of the image of the unknown color sample and determining a true average green color value of the unknown color sample based on an intensity profile of the second one of the concentric rings and a polar angle of the second radial cross-section, and determining, in the image, a third radial cross-section of a third one of the concentric rings having an intensity that matches a determined average blue color value of the image of the unknown color sample and determining a true average blue color value of the unknown color sample based on an intensity profile of the third one of the concentric rings and a polar angle of the third radial cross-section, and determining the polar angle of the second and third radial cross-sections.

15. The method of claim 13, further comprising determining the true color of the unknown color sample based on the true average red color value, a true average green color value, and a true average blue color value.

16. The method of claim 11, wherein the template further comprises distinctive markings at known locations and further comprising determining the center of the concentric rings from the image using geometric relationships between the distinctive markings and the center, and using the center of the concentric rings to determine a radial segment on which a radial cross-section lies.

17. The method of claim 11, further comprising determining, in the image, another radial cross-section of another of the concentric rings having an intensity that matches the determined average red color value of the image of the unknown color sample and determining a second true average red color value of the unknown color sample based on a ring intensity profile of the another of the concentric rings and a polar angle of the another radial cross-section, and determining a final true average red color value of the unknown color sample by calculating a weighted average of the true average red color value and the second true average red color value.

18. A color identification system, comprising:
a template card comprising one or more full gray scale continuums, wherein a true color intensity along each continuum is a function of geometric position on the template card;
an image obtaining device configured to obtain an image of an unknown color sample adjacent to the template card; and
color identification processors configured to determine geometric positions on the gray scale continuums in the image where their intensities match determined red, green, and blue color values of the image of the unknown color sample, and to use the determined geometric positions to determine the true color intensity of the gray scale continuum at each geometric position, and to use these true color intensities to determine the color of the unknown color sample.

19. A color identification method, comprising:

obtaining an image of an unknown color sample adjacent to a template comprising one or more full gray scale continuums, wherein a true intensity along each continuum is a function of geometric position on the template;

determining geometric positions on the gray scale continuums in the image where intensity matches determined red, green, and blue color values of the image of the unknown color sample;

determining the true intensity of the gray scale continuums at each geometric position based on the determined geometric positions; and determining the color of the unknown color sample based on these true intensities;

wherein the method is performed utilizing a camera.

* * * * *